(12) United States Patent
Goetz

(10) Patent No.: US 8,445,045 B2
(45) Date of Patent: May 21, 2013

(54) PINEAPPLE COATING APPLICATION DEVICE WITH APPLICATOR AND CONVEYOR BRUSHES AND RELATED METHODS

(75) Inventor: Robert R. Goetz, Garden Grove, CA (US)

(73) Assignee: John Bean Technologies Corporation, Chicago, IL (US)

( * ) Notice: Subject to any disclaimer, the term of this patent is extended or adjusted under 35 U.S.C. 154(b) by 175 days.

(21) Appl. No.: 13/090,510

(22) Filed: Apr. 20, 2011

(65) Prior Publication Data

US 2012/0269941 A1 Oct. 25, 2012

(51) Int. Cl.
*A23L 1/00* (2006.01)
*A23B 7/16* (2006.01)

(52) U.S. Cl.
USPC ............................. 426/302; 426/310; 118/18

(58) Field of Classification Search
USPC ........................ 426/89, 302, 208, 310; 118/18
See application file for complete search history.

(56) References Cited

U.S. PATENT DOCUMENTS

| | | |
|---|---|---|
| 2,010,341 A | 8/1935 | Wilson et al. |
| 2,010,497 A | 8/1935 | Skinner et al. |
| 2,033,044 A | 3/1936 | De et al. |
| 2,141,550 A | 12/1938 | Paxton |
| 2,153,294 A | 4/1939 | Brogden |
| 2,153,295 A | 4/1939 | Brogden |
| 2,212,621 A | 8/1940 | Sharma |
| 2,412,686 A | 12/1946 | Kalmar |
| 2,700,953 A | 2/1955 | Howe et al. |
| 2,738,761 A | 3/1956 | Gerwe |
| 2,821,957 A | 2/1958 | Fitzgerald |
| 2,903,995 A | 9/1959 | Fitzgerald |
| 3,236,680 A | 2/1966 | Hnot |
| 3,452,448 A | 7/1969 | Bradford |
| 3,460,596 A | 8/1969 | Vadas |
| 3,680,493 A | 8/1972 | Lanham et al. |
| 3,818,859 A | 6/1974 | Kalmar |
| 3,896,243 A | 7/1975 | Vadas |
| 4,015,366 A | 4/1977 | Hall, III ............................. 47/1 |
| 4,109,021 A | 8/1978 | Loveland |
| 4,230,065 A | 10/1980 | Carter et al. |
| 4,265,360 A | 5/1981 | Khodos |
| 4,465,714 A | 8/1984 | Petro, IV ...................... 427/424 |
| 4,477,483 A * | 10/1984 | Lewis ................. 427/8 |
| 4,678,075 A | 7/1987 | Bowman |
| 4,710,388 A | 12/1987 | Liu ............................. 426/102 |
| 5,101,763 A | 4/1992 | Creason et al. ............... 118/683 |
| 5,451,266 A | 9/1995 | Kirk et al. |
| 5,620,519 A | 4/1997 | Affeldt et al. ................. 118/669 |
| 6,153,253 A | 11/2000 | Affeldt et al. ..................... 427/8 |
| 6,565,016 B2 | 5/2003 | Madden .................. 239/222.11 |
| 2004/0005390 A1 | 1/2004 | Newman |
| 2004/0043126 A1 | 3/2004 | Grewal |

* cited by examiner

*Primary Examiner* — Jyoti Chawla
(74) *Attorney, Agent, or Firm* — Allen, Dyer, Doppelt, Milbrath & Gilchrist, P.A.

(57) ABSTRACT

A pineapple coating application device may include a frame, and a pineapple roller conveyor carried by the frame and having laterally extending conveyor brushes to advance pineapples along a longitudinal path of travel. Adjacent ones of the laterally extending conveyor brushes may rotatably capture the pineapples therebetween. The pineapple coating application device may include a pineapple coating dispenser, and a laterally extending applicator brush positioned above the pineapple roller conveyor to cooperate with the laterally extending conveyor brushes to apply a coating to the pineapples from the pineapple coating dispenser as the pineapples are rotated and advanced along the longitudinal path of travel.

17 Claims, 4 Drawing Sheets

PINEAPPLE COATING APPLICATION DEVICE WITH APPLICATOR AND CONVEYOR BRUSHES AND RELATED METHODS

FIELD OF THE INVENTION

The present invention relates to the field of product processing, and, more particularly, to coating application to products and related methods.

BACKGROUND OF THE INVENTION

A packinghouse is a facility where goods, such as fruit and vegetables, are received and processed prior to distribution to market. In the typical packinghouse, the goods are first received and then sorted based upon several factors, for example, size and quality grade. Once sorted, the goods are moved through the packinghouse via conveyor belts for downstream processing, such as labeling and packaging.

One example of downstream processing for fruits and vegetables sorted for direct sale is the application of wax to the exterior of the product. Advantageously, the wax provides a barrier for aiding in maintaining the internal moisture of the fruit or vegetable. Additionally, the wax may inhibit mold growth, protect fruits and vegetables from bruising, prevent other physical damage and disease, and enhance appearance. In short, the application of the wax keeps the fruit or vegetable in good shape during transit to the final point of sale, for example, a supermarket.

As is typical in the packinghouse, the fruits and vegetables are processed in large numbers and relatively quickly due to the perishable nature of the product. Accordingly, manual application of the wax to each fruit or vegetable is impractical and onerous. One approach to this concern is machine driven wax applicators.

For example, U.S. Pat. Nos. 2,821,957 and 2,903,995 to Fitzgerald disclose a device for applying wax to fruits and vegetables. The device includes an endless conveyor belt, and a plurality of brushes above the conveyor belt. The conveyor belt receives the fruits and moves them down a longitudinal path. The device includes a wax reservoir above each brush that periodically dispenses wax directly on the brush.

Another approach is disclosed in U.S. Pat. No. 5,101,763 to Creason et al., which also discloses a fruit wax application device. This device includes a two-stage wax application process, the first stage depositing a fungicide and wax mixture on the fruits and the second stage depositing a second layer of wax on the fruits. The device includes a brush bed conveyor for moving the fruit down a longitudinal path past a pair of spray assemblies.

Yet another device is disclosed in U.S. Pat. No. 6,153,253 to Affeldt et al. This device includes a brush bed conveyor for moving the fruit down a longitudinal path, a pair of controlled spray nozzles for coating the fruit with wax, and a camera for capturing images of the fruit. The device also includes a controller for configuring the spray nozzles to selectively spray each fruit based upon detected characteristics of the fruit, for example, size.

U.S. Pat. No. 2,738,761 to Gerwe, assigned to the present application's assignee and the contents of which are incorporated by reference in their entirety, discloses a fruit wax application device including a plurality of brushes, and a plurality of rollers for conveying the fruit down a longitudinal path under the brushes. The device includes a wax spray nozzle above the brushes for dispensing the wax thereto.

U.S. Pat. No. 2,412,686 to Kalmar, assigned to the present application's assignee and the contents of which are incorporated by reference in their entirety, discloses a fruit wax application device including an endless conveyor of rollers for moving the fruit down a longitudinal path. The device includes a spray nozzle for applying a coating of wax to the fruits as they pass through the endless conveyor.

Of course, in each of the above devices, the fruits and vegetables being conveyed were substantially round in shape, for example, oranges, potatoes, etc. Fruits and vegetables having such a shape are more readily conveyed throughout the packinghouse. Nonetheless, some fruits are not so readily conveyed in the packinghouse, for example, the pineapple including the oblong body portion and the lengthy crown/stem part.

More specifically, the aforementioned wax application process may be problematic due to the shape of the pineapple. Accordingly, the application of wax coatings to pineapples is typically performed via a flooding process. The flooding process may have several drawbacks though. For example, the flooding process may not be efficient as a significant amount of wax is consumed to flood the pineapple. Because of this inefficiency, the typical wax flooding process includes a recapturing element for recycling the used wax. Nevertheless, the recycled wax may include contaminants, such as dirt and pests. Moreover, the recycled wax may lose potency due to unintended dilution during the recapturing process. Also, the flooding process may provide little to no control on the application of wax to the pineapple.

SUMMARY OF THE INVENTION

In view of the foregoing background, it is therefore an object of the present invention to provide a pineapple coating application apparatus that efficiently coats pineapples.

This and other objects, features, and advantages in accordance with the present invention are provided by a pineapple coating application apparatus. The pineapple coating application apparatus may comprise a frame, and a pineapple roller conveyor carried by the frame and comprising a plurality of laterally extending conveyor brushes to advance pineapples along a longitudinal path of travel. Adjacent ones of the plurality of laterally extending conveyor brushes may be configured to rotatably capture at least one of the pineapples therebetween. The pineapple coating application apparatus may include at least one pineapple coating dispenser, and at least one laterally extending applicator brush positioned above the pineapple roller conveyor and configured to cooperate with the plurality of laterally extending conveyor brushes to apply a coating to the pineapples from the at least one pineapple coating dispenser as the pineapples are rotated and advanced along the longitudinal path of travel. Advantageously, the pineapple coating application apparatus may coat the pineapples readily as they are advanced along the longitudinal path.

In some embodiments, the pineapple roller conveyor may comprise an endless drive arrangement rotatably mounting the plurality of laterally extending conveyor brushes. The pineapple coating application apparatus may further comprise a conveyor drive arrangement for rotatably driving the plurality of laterally extending conveyor brushes. Also, the pineapple coating application apparatus may further comprise an applicator drive arrangement for rotatably driving the at least one laterally extending applicator brush. Additionally, the pineapple coating application apparatus may further comprise a controller cooperating with the at least one pineapple coating dispenser for preferentially supplying the coating differently along portions of each applicator brush corresponding to differing portions of each pineapple.

In particular, the pineapple coating application apparatus may further comprise a longitudinally extending pineapple guide rail above the pineapple roller conveyor. For example, the longitudinally extending pineapple guide rail may be configured to maintain the pineapples in laterally extending pairs with bottoms thereof facing one another and separated by the longitudinally extending pineapple guide rail.

Additionally, the at least one pineapple coating dispenser may comprise a plurality thereof above the at least one laterally extending applicator brush. At least some of the plurality of pineapple coating dispensers may be adjacent the longitudinally extending pineapple guide rail and may be configured to supply the coating to the bottoms of the pineapples. Also, at least some others of the pineapple coating dispensers may be adjacent longitudinal side edges of the plurality of laterally extending conveyor brushes and may be configured to supply the coating to the crowns of the pineapples. For example, the at least one pineapple coating dispenser may comprise at least one of a controlled droplet atomizer (CDA) applicator, and a nozzle applicator.

Another aspect is directed to a method of pineapple coating. The method may comprise advancing pineapples along a longitudinal path of travel on a pineapple roller conveyor, using adjacent ones of a plurality of laterally extending conveyor brushes from the pineapple roller conveyor to rotatably capture at least one of the pineapples therebetween, and using at least one laterally extending applicator brush and the plurality of laterally extending conveyor brushes to apply a coating to the pineapples from at least one pineapple coating dispenser as the pineapples are advanced along the longitudinal path of travel.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
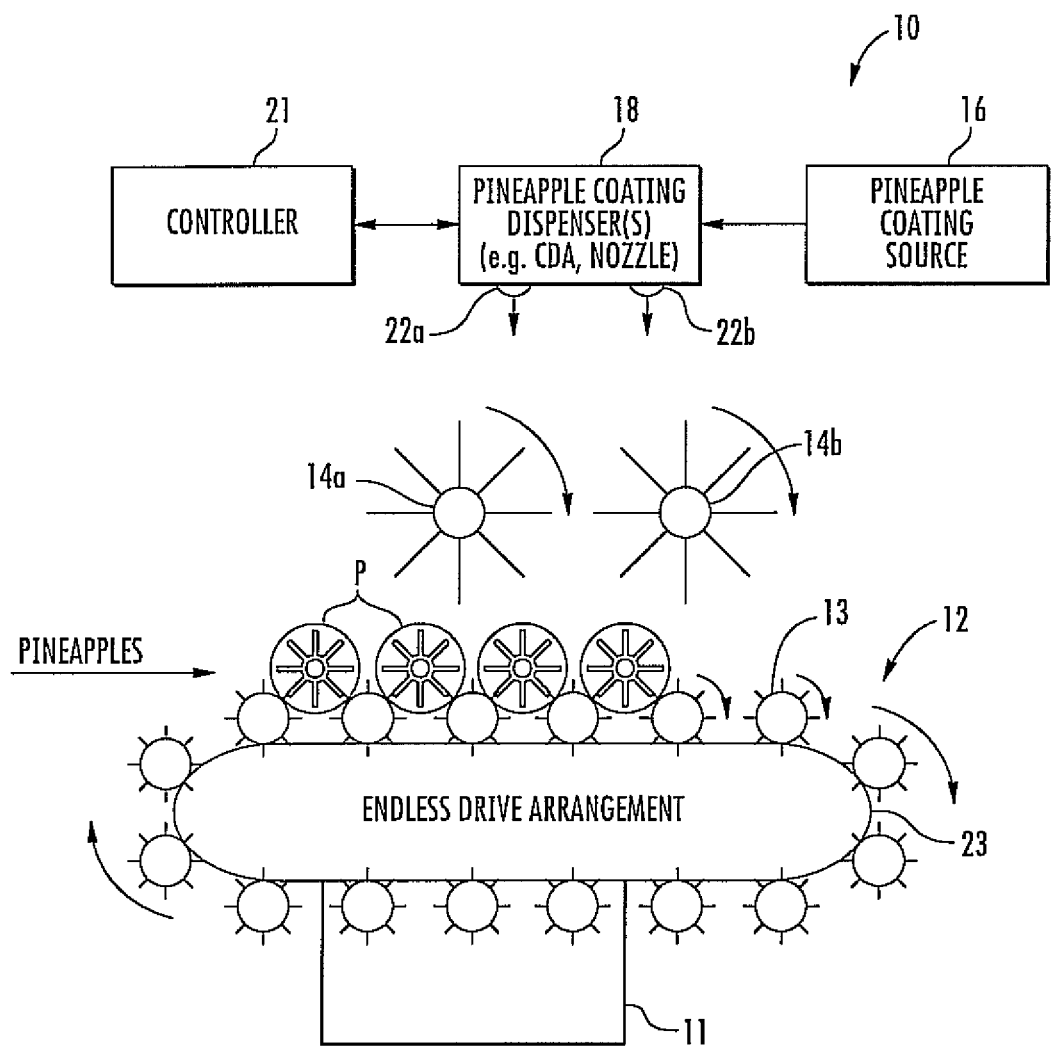
FIG. 1 is a schematic diagram of a pineapple coating application apparatus, according to the present invention.
Figure 2:
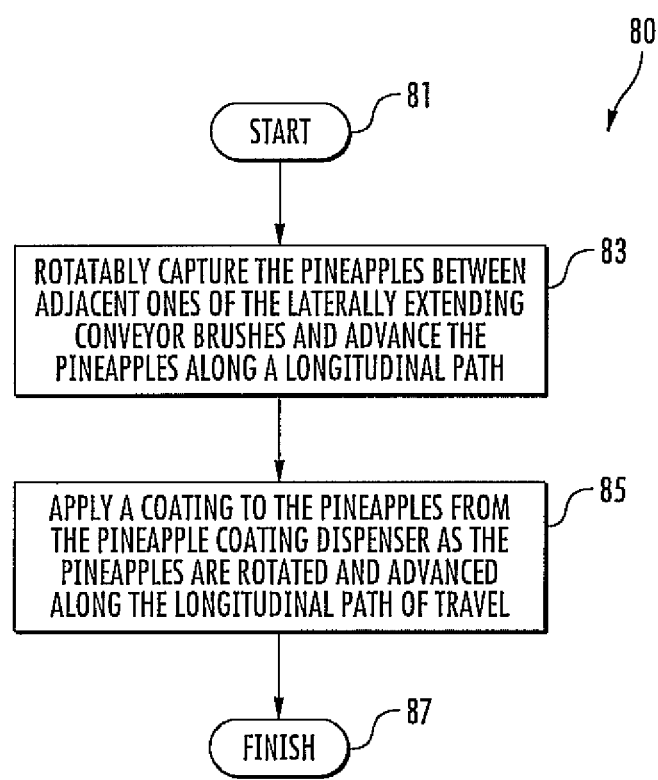
FIG. 2 is a flowchart illustrating operation of the pineapple coating application apparatus of FIG. 1.

Referring initially to FIGS. 1-2, a pineapple coating application apparatus 10 according to the present invention is now described. Additionally, a flowchart 80 illustrates operation of the pineapple coating application apparatus 10 and begins at Block 81. The pineapple coating application apparatus 10 illustratively includes a frame 11, and a pineapple roller conveyor 12 carried by the frame. The pineapple roller conveyor 12 illustratively includes a plurality of laterally extending conveyor brushes 13 (i.e. roller brushes), and an endless drive arrangement 23 rotatably mounting the plurality of laterally extending conveyor brushes and configured to advance the plurality of laterally extending conveyor brushes to define a longitudinal path of travel for pineapples P. Of course, as will be appreciated by those skilled in the art, other drive arrangements may be used.

As illustrated, the laterally extending conveyor brushes 13 move in a clockwise motion, and each roller individually rotates clockwise. Moreover, the laterally extending conveyor brushes 13 are substantially parallel in arrangement. Adjacent ones of the laterally extending conveyor brushes 13 are configured to rotatably capture at least one of the pineapples P therebetween (Block 83).

The pineapple coating application apparatus 10 illustratively includes a pineapple coating dispenser 18, and a pineapple coating source 16 coupled thereto. For example, the pineapple coating source 16 may comprise a reservoir or tank. In some embodiments, the pineapple coating source 16 may be positioned adjacent the pineapple coating application apparatus 10, but in others, it may be located in another portion of the packinghouse and connected thereto via some form of fluid coupling, such as tubing. For example, the coating may comprise at least one of a synthetic wax, a natural wax, a fungicide, and a pesticide. In addition, the pineapple coating dispenser 18 may comprise at least one of a controlled droplet atomizer (CDA) applicator, and a nozzle applicator.

The pineapple coating application apparatus 10 illustratively includes a plurality of rotatably driven laterally extending applicator brushes 14a-14b positioned above the pineapple roller conveyor 12 and configured to cooperate with the laterally extending conveyor brushes 13 to rotate the pineapples P and apply a coating thereto from the pineapple coating dispenser 18 as the pineapples are advanced along the longitudinal path of travel by the pineapple roller conveyor (Block 85). Although the applicator brushes 14a-14b are illustrated as being spaced above the pineapples P for clarity of explanation purposes, as will be appreciated by those skilled in the art, in a typical embodiment, the applicator brushes will directly contact the pineapples and urge them to rotate (counterclockwise) on the laterally extending conveyor brushes 13.

In illustrated embodiment, the pineapple coating application apparatus 10 illustratively includes a controller 21 cooperating with the pineapple coating dispenser 18 for preferentially supplying the coating differently along portions of each applicator brush 14a-14b corresponding to differing portions of each pineapple P. For example, the controller 21 may cooperate with a pump module (not shown) to meter the volume of coating supplied to the pineapple coating dispenser 18. Advantageously, dependihg on the shape and size of the body portion of the pineapples P, the controller 21 may compensate by applying the corresponding amount of coating to each application brush 14a-14b. In some embodiments, the controller 21 may control the pineapple coating dispenser 18 in a pulsed manner to match the flow of pineapples P through the pineapple roller conveyor 12 and to reduce overuse of wax.

In some embodiments, the controller 21 may divide each applicator brush 14a-14b into a plurality of application zones corresponding to the parts of the pineapple, i.e. the crown, the peduncle, and the body, and modulate the application of coating fluid thereto based upon the application zones. More so, the pineapple coating application apparatus 10 illustratively includes a pair of nozzles 22a-22b coupled to the pineapple coating dispenser 18 and for applying the coating. The controller 21 will allow operators to adjust the wax pump outputs to the nozzles or CDAs, brush rotating speeds, and forward moving conveyor speed to achieve the best desired wax application in any one area.

Advantageously, as the pineapples P progress through the pineapple coating application apparatus 10, the pineapples are rotated by the rotating action of the applicator brushes 14a-14b and the laterally extending conveyor brushes 13. Moreover, since the laterally extending conveyor brushes 13 rotate and capture the pineapples P, the entire exterior surface of each pineapple is effectively and efficiently coated with an amount of coating, in contrast with conventional flooding approaches. In particular, the applicator brushes 14a-14b effectively work in the coating into the crevices of the pineapples P, for example, the eyes on the body portion. When the pineapples P are finished being carried through the pineapple coating application apparatus 10, they will be delivered back onto the process line moving toward packaging (Block 87).

In the illustrated embodiment, the applicator brushes 14a-14b and the laterally extending conveyor brushes 13 rotate clockwise to cause the pineapples P to rotate counterclockwise. As will be appreciated by those skilled in the art, the rotational directions of these brushes could be reversed, i.e. the conveyor brushes 13 and the applicator brushes 14a-14b could rotate counterclockwise, thereby causing the pineapples P to rotate clockwise. Moreover, since the applicator brushes 14a-14b are long bristled, the rotation thereof could be reversed in relation to the laterally extending conveyor brushes 13, i.e. the conveyor brushes can rotate clockwise and the applicator brushes can rotate counterclockwise, thereby causing the pineapples P to still rotate counterclockwise, but more effectively driving the coating into the crevices of the pineapples.

Figure 3:
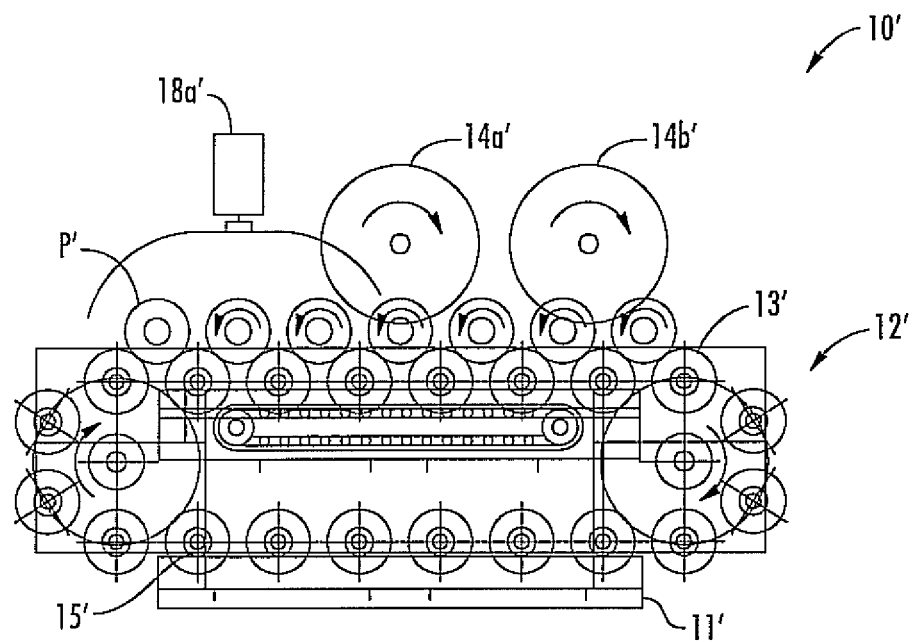
FIG. 3 is a detailed schematic diagram of a side view of another embodiment of the pineapple coating application apparatus, according to the present invention.
Figure 4:
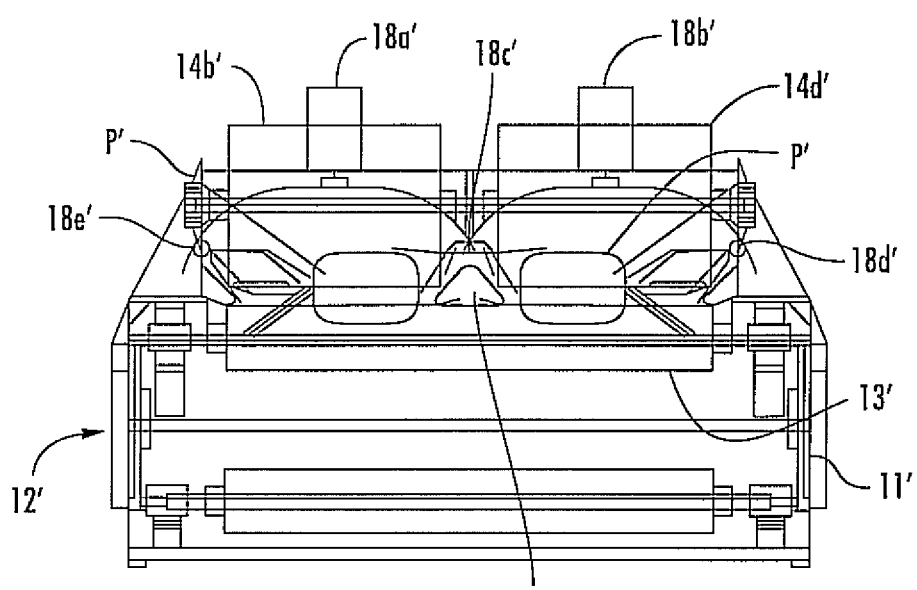
FIG. 4 is a detailed schematic diagram of a front view of the pineapple coating application apparatus of FIG. 3.
Figure 5:
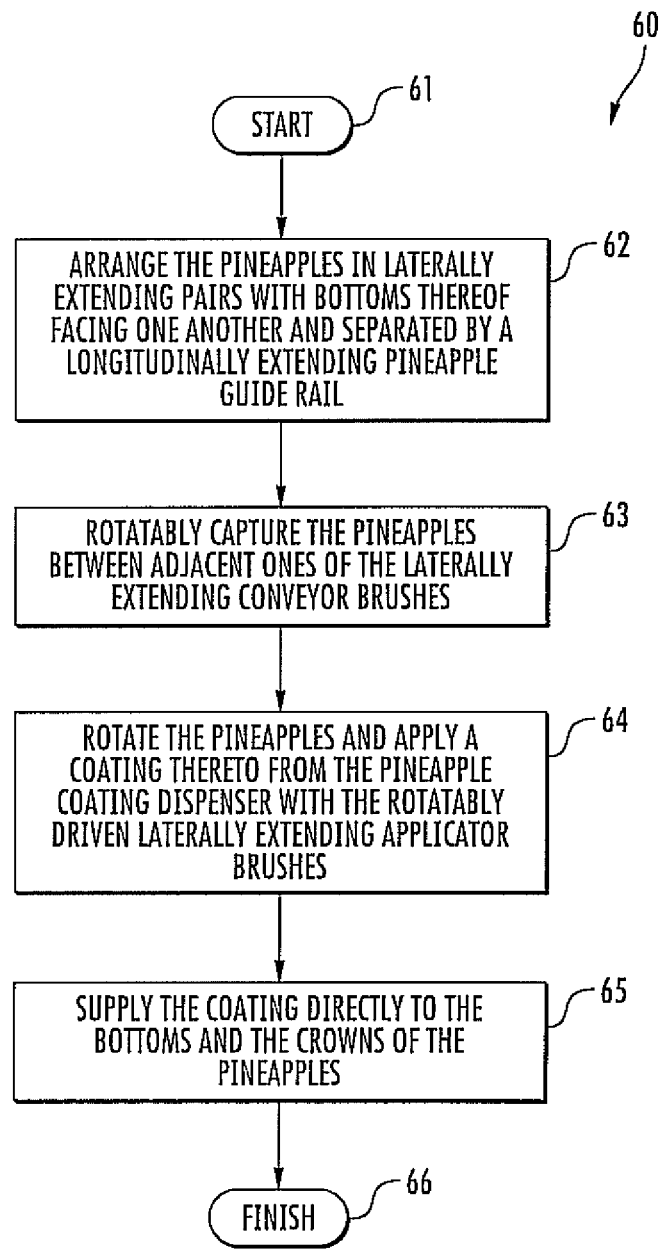
FIG. 5 is a flowchart illustrating operation of the pineapple coating application apparatus of FIGS. 3-4.

Referring now additionally to FIGS. 3-5, another embodiment of the pineapple coating application apparatus 10' is now described and another flowchart 60 illustrates operation thereof. In this embodiment of the pineapple coating application apparatus 10', those elements already discussed above with respect to FIGS. 1-2 are given prime notation and most require no further discussion herein. This embodiment differs from the previous embodiment in that the pineapple coating application apparatus 10' further includes a longitudinally extending pineapple guide rail 24' above the pineapple roller conveyor 12'. As perhaps best seen in FIG. 4, the longitudinally extending pineapple guide rail 24' is configured to maintain the pineapples P' in laterally extending pairs with bottoms thereof facing one another and separated by the longitudinally extending pineapple guide rail (Block 62).

Advantageously, the pineapple coating application apparatus 10' can process a significant rate of pineapples P' for coating application. Although the illustrated embodiment processes two paths of pineapples P', in other embodiments, the pineapple coating application apparatus 10' may include several applicator brushes processing corresponding parallel paths of pineapples P'. As will be appreciated by those skilled in the art, the readily scalable throughput of the pineapple coating application apparatus 10' is very advantageous in the typical packinghouse environment.

Additionally, in the illustrated embodiment, the pineapple coating application apparatus 10' includes a plurality of pineapple coating dispensers 18a'-18e'. The pineapple coating dispensers 18a'-18b' include a first pineapple coating dispenser 18a' above the first plurality of rotatably driven laterally extending applicator brushes 14a'-14b', and a second pineapple coating dispenser 18b' above the second plurality of rotatably driven laterally extending applicator brushes 14c'-14d' (14c' not shown). In other words, in this illustrated embodiment, there are two parallel arrays of rotatably driven laterally extending applicator brushes 14a'-14d' for processing two lines of pineapples P'. The first and second pineapple coating dispensers 18a'-18b' apply the coating to the rotatably driven laterally extending applicator brushes 14a'-14d', the laterally extending conveyor brushes 13', and directly to the pineapples P' (Blocks 63-64).

Also, the pineapple coating dispensers illustratively include a third pineapple coating dispenser 18c' adjacent the longitudinally extending pineapple guide rail 24' and is configured to supply the coating directly to the bottoms of the pineapples P' (Blocks 65 & 66). In particular, the third pineapple coating dispenser 18c' has a bidirectional spray nozzle for simultaneously coating the bottoms of the two lines of pineapples P'.

The longitudinally extending pineapple guide rail 24' illustratively works to keep the pineapples P' positioned so that they can be coated with wax consistently as they move through the process. This longitudinally extending pineapple guide rail 24' may help improve the wax application to the peduncle and crown sections of the pineapple P' and could enable the applicator to apply different blends of wax suitable for those unique areas of the pineapple by feeding each nozzle manifold section of the third pineapple coating dispenser 18c' with a different wax blend. Each section of the pineapple P' is susceptible to different pests, and this control feature may enable more precise and effective application. The nozzles used in the third pineapple coating dispenser 18c' may have a full cone spray pattern similar to Spraying Systems 1/8GG-SS 3.5, as available from the Spraying Systems Company of Chicago, Ill., and may work together with the rotatably driven laterally extending applicator brushes 14a'-14d' to spread the wax evenly on the peduncle and crown areas.

Also, the pineapple coating dispensers 18a'-18b' illustratively include fourth and fifth pineapple coating dispensers 18d'-18e' positioned at lateral ends/edges of the laterally extending conveyor brushes 13'. The fourth and fifth pineapple coating dispensers 18d'-18e' are configured to coat the crowns of the pineapples P'. Yet more, in the illustrated embodiment, the pineapple coating application apparatus 10' includes a drive device 15, for example, a drive chain, for rotating the laterally extending conveyor brushes 13' as they rotate around the endless drive arrangement.

Advantageously, while the applicator brushes 14a'-14d' work the coating into the major surfaces of the body for each pineapple P', the third pineapple coating dispenser 18c' applies a small controlled spray of coating onto the bottom portion. Moreover, the fourth and fifth pineapple coating dispensers 18d'-18e' supply respective controlled sprays for coating the crown portion. In short, the pineapple coating application apparatus 10' uses the appropriate application method for each part of the pineapple P', using the applicator brushes for the large body portions and small controlled sprays for the irregularly shaped and crown and end portions. In some embodiments, different wax blends can be supplied to each of the pineapple coating dispensers 18a'-18e', thereby applying the particular wax blend of fungicides and pesticides to each different part of the Pineapple P'.

Pineapples P', which typically are carried through a wax application processing line on hard roll conveyors under typical flooding wax application, are instead delivered from the hard roll conveyor (not shown) into the pineapple roller conveyor 12' by way of a mechanical delivery or hand placement, for example. The laterally extending conveyor brushes 13' comprises brushes designed specifically for applying wax to produce, such as the illustrated pineapples P'. These laterally extending conveyor brushes 13' are made of a blend of 50% horsehair filaments and 50% polypropylene filaments and are typically 4.75" in diameter. The laterally extending conveyor brushes 13' hold excess wax on the filaments when applied to them directly or indirectly, i.e. similar to a paint brush. Utilizing this functionality of the laterally extending conveyor brushes 13', wax material is not wasted if extra is applied to the pineapples P' as the brush will take excess wax off the pineapples and hold it for subsequent application to other pineapples. And conversely, if not enough wax is applied to the pineapples P', then the laterally extending conveyor brushes 13' release the amount necessary to adequately coat the pineapple. These rotating laterally extending conveyor brushes 13' will rotate the pineapples P' and move forward through the system. The pineapples P' rotate counterclockwise multiple times depending on the speed of rotation selected and size of the pineapple. The rotatably driven laterally extending applicator brushes 14a'-14b' may have a larger diameter (12") and are stationary. The rotatably driven laterally extending applicator brushes 14a'-14b' have similar construction to the rotating laterally extending conveyor brushes 13' and are mounted above for moving the pineapples P' past below them while rotating clockwise.

The rotatably driven laterally extending applicator brushes 14a'-14b' do not touch the rotating laterally extending conveyor brushes 13', but do touch the upper third of the pineapple P' as they rotate and move past. Since the rotating laterally extending conveyor brushes 13' rotate the pineapples P' counterclockwise, the rotatably driven laterally extending applicator brushes 14a'-14b' help drive wax into difficult to wax parts of the pineapple surface. This interaction of brushes and pineapples P' provide additional control of wax application volumes and appearance.

The wax can be delivered through a application control system to the rotating brush conveyor 12', in particular, the rotating laterally extending conveyor brushes 13', the rotatably driven laterally extending applicator brushes 14a'-14b', and the pineapples P' by way of pineapple coating dispensers 18a'-18e', such as nozzles, CDAs or drip system designs, all being fed by a fluid pump, for example, an LMI Model B131-362 diaphragm pump, as available from the Milton Roy Company of Ivyland, Pa. The combination of the wax being delivered onto the pineapple P' by any of these devices and the action of the brushes touching the surface of the pineapple will work the wax into the difficult areas of the pineapple surface such as the eyes, peduncle (bottom), and crown, which are unique to pineapples when compared to fruits like apples and oranges.

Another aspect is directed to a method of making a pineapple coating application apparatus 10 that may comprise forming a pineapple roller conveyor 12 comprising a plurality of laterally extending conveyor brushes 13. The method may also comprise coupling an endless drive arrangement 23 for rotatably mounting the plurality of laterally extending conveyor brushes 13 and to advance the plurality of laterally extending conveyor brushes to define a longitudinal path of travel for pineapples P, adjacent ones of the plurality of laterally extending conveyor brushes rotatably capturing at least one of the pineapples therebetween. The method may also comprise providing at least one pineapple coating dispenser 18, and coupling a plurality of rotatably driven laterally extending applicator brushes 14a-14b to be positioned above the pineapple roller conveyor 12 to rotate the pineapples P and apply a coating thereto from the at least one pineapple coating dispenser as the pineapples are advanced along the longitudinal path of travel by the pineapple roller conveyor.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A pineapple coating application apparatus comprising:
   a frame;
   a pineapple roller conveyor carried by said frame and comprising
      a plurality of laterally extending conveyor brushes to advance pineapples along a longitudinal path of travel, adjacent ones of said plurality of laterally extending conveyor brushes configured to rotatably capture at least one of the pineapples therebetween, and
      an endless drive arrangement rotatably mounting said plurality of laterally extending conveyor brushes and configured to advance said plurality of laterally extending conveyor brushes;
   at least one pineapple coating dispenser;
   at least one laterally extending applicator brush positioned above said pineapple roller conveyor and configured to cooperate with said plurality of laterally extending conveyor brushes to apply a coating to the pineapples from said at least one pineapple coating dispenser as the pineapples are rotated and advanced along the longitudinal path of travel; and
   a controller cooperating with said at least one pineapple coating dispenser for preferentially supplying the coating differently along of each applicator brush corresponding of each pineapple.

2. The pineapple coating application apparatus of claim 1 further comprising a conveyor drive arrangement for rotatably driving said plurality of laterally extending conveyor brushes.

3. The pineapple coating application apparatus of claim 1 further comprising an applicator drive arrangement for rotatably driving said at least one laterally extending applicator brush.

4. The pineapple coating application apparatus of claim 1 wherein said at least one pineapple coating dispenser comprises at least one of a controlled droplet atomizer (CDA) applicator, and a nozzle applicator.

5. The pineapple coating application apparatus of claim 1 further comprising a longitudinally extending pineapple guide rail above said pineapple roller conveyor.

6. The pineapple coating application apparatus of claim 5 wherein said longitudinally extending pineapple guide rail is configured to maintain the pineapples in laterally extending pairs with bottoms thereof facing one another and separated by said longitudinally extending pineapple guide rail.

7. The pineapple coating application apparatus of claim 5 wherein said at least one pineapple coating dispenser comprises a plurality thereof above said at least one laterally extending applicator brush.

8. The pineapple coating application apparatus of claim 7 wherein at least some of said plurality of pineapple coating dispensers are adjacent said longitudinally extending pineapple guide rail and are configured to supply the coating to the bottoms of the pineapples.

9. The pineapple coating application apparatus of claim 7 wherein at least some others of said plurality of pineapple coating dispensers are adjacent longitudinal side edges of said plurality of laterally extending conveyor brushes and are configured to supply the coating to the crowns of the pineapples.

10. A pineapple coating application apparatus comprising:
a frame;
a pineapple roller conveyor carried by said frame and comprising
   a plurality of laterally extending conveyor brushes to advance pineapples along a longitudinal path of travel, adjacent ones of said plurality of laterally extending conveyor brushes configured to rotatably capture at least one of the pineapples therebetween and so that the at least one pineapple extends laterally with said plurality of laterally extending conveyor brushes, and
   an endless drive arrangement rotatably mounting said plurality of laterally extending conveyor brushes;
a plurality of pineapple coating dispensers;
a longitudinally extending pineapple guide rail above said pineapple roller conveyor and configured to maintain the pineapples in laterally extending pairs with bottoms thereof facing one another and separated by said longitudinally extending pineapple guide rail; and
a plurality of rotatably driven laterally extending applicator brushes positioned above said pineapple roller conveyor and configured to cooperate with said plurality of laterally extending conveyor brushes to apply a coating to a body of the pineapples from at least one of said, plurality of pineapple coating dispensers as the pineapples are rotated and advanced along the longitudinal path of travel;
at least some of said plurality of pineapple coating dispensers being adjacent said longitudinally extending pineapple guide rail and configured to supply the coating to the bottoms of the pineapples;
at least some others of said plurality of pineapple coating dispensers being adjacent longitudinal side edges of said plurality of laterally extending conveyor brushes and configured to supply the coating to the crowns of the pineapples.

11. The pineapple coating application apparatus of claim 10 further comprising a controller cooperating with said plurality of pineapple coating dispensers for preferentially supplying the coating differently along portions of each applicator brush corresponding to differing portions of each pineapple.

12. The pineapple coating application apparatus of claim 10 wherein said plurality of pineapple coating dispensers comprises at least one of a controlled droplet atomizer (CDA) applicator, and a nozzle applicator.

13. A method of pineapple coating comprising:
advancing pineapples along a longitudinal path of travel on a pineapple roller conveyor comprising an endless drive arrangement;
using adjacent ones of a plurality of laterally extending conveyor brushes from the pineapple roller conveyor to rotatably capture at least one of the pineapples therebetween, the endless drive arrangement rotatably mounting the plurality of laterally extending conveyor brushes and advancing the plurality of laterally extending conveyor brushes; and
using at least one laterally extending applicator brush and the plurality of laterally extending conveyor brushes to apply a coating to the pineapples from at least one pineapple coating dispenser as the pineapples are advanced along the longitudinal path of travel; and
using the at least one pineapple coating dispenser to preferentially supply the coating differently along portions of each applicator brush corresponding to differing portions of each pineapple.

14. The method of claim 13 further comprising using a longitudinally extending pineapple guide rail above the pineapple roller conveyor to maintain the pineapples in laterally extending pairs with bottoms thereof facing one another and separated by the longitudinally extending pineapple guide rail.

15. The method of claim 13 wherein the at least one pineapple coating dispenser comprises a plurality thereof above the at least one laterally extending applicator brush.

16. The method of claim 15 wherein at least some of the plurality of pineapple coating dispensers are adjacent the longitudinally extending pineapple guide rail and are configured to supply the coating to the bottoms of the pineapples.

17. The method of claim 15 wherein at least some others of the plurality of pineapple coating dispensers are adjacent longitudinal side edges of the plurality of laterally extending conveyor brushes and are configured to supply the coating to the crowns of the pineapples.

* * * * *